United States Patent Office 3,420,609
Patented Jan. 7, 1969

3,420,609
PHOTOMETER FOR COMPARING SCATTERED WITH TRANSMITTED LIGHT
Shichibei Kozawa, Yasucho, Shiga Prefecture, Japan, assignor to Shimadzu Seisakusho Ltd., Kyoto, Japan, a corporation of Japan
Filed Aug. 27, 1964, Ser. No. 392,423
U.S. Cl. 356—104          17 Claims
Int. Cl. G01n 21/00

ABSTRACT OF THE DISCLOSURE

In a photometer for automatically drawing Zimm plots, a light source directed upon a solute and solvent sample, a first photocell rotatable to varying positions for producing an output proportional to the intensity of light scattered by the sample at different angles, a second photocell for producing an output proportional to the intensity of light transmitted through the sample, a recorder pen, means for converting the movement of the first photocell to a movement of the recorder pen along a first orthogonal axis, means for converting the movement of the first photocell and the outputs of both the first and second photocells to a movement of the recorder pen along a second orthogonal axis, whereby the combined movements of the recorder pen along the orthogonal axes results in the formation of a Zimm plot as defined in the Journal of Chemical Physics, vol. 16, page 1099 (1948).

---

This invention relates to a photometer, and more particularly to a photoelectric light scattering photometer which is capable of automatically drawing Zimm plots.

It is well known that when light is passed through a solution of a high polymer, scattering takes place, and that the measurement of the intensity of the scattered light is utilized to determine the molecular weight, shape and size of the high polymer and to obtain information about the interaction between the molecules. Light scattering photometers are known as instruments for this purpose. The instruments are designed to measure and indicate and/or record the intensities of light scattered from the sample being analyzed in various directions with respect to the optical axis of the instrument. The data thus obtained by the measurement are analyzed and usually introduced into various calculations to produce Zimm plots. However, calculations involved in making Zimm plots from the measurement data obtained by light scattering photometers of known types are very complicated and time-consuming.

The primary object of the invention is, therefore, to provide a new and improved light scattering photometer which is capable of automatically producing Zimm plots without any such complicated intermediate calculations as have hitherto been required of the known types.

Another object of the invention is to provide such a light scattering photometer as mentioned above which is capable of marking the curves being drawn at every predetermined angle of scattering.

Other objects, features and advantages of the invention will be apparent from the following description with reference to the accompanying drawings, wherein:

FIG. 5a is a modification of a portion of FIG. 4a;

Figure 1:
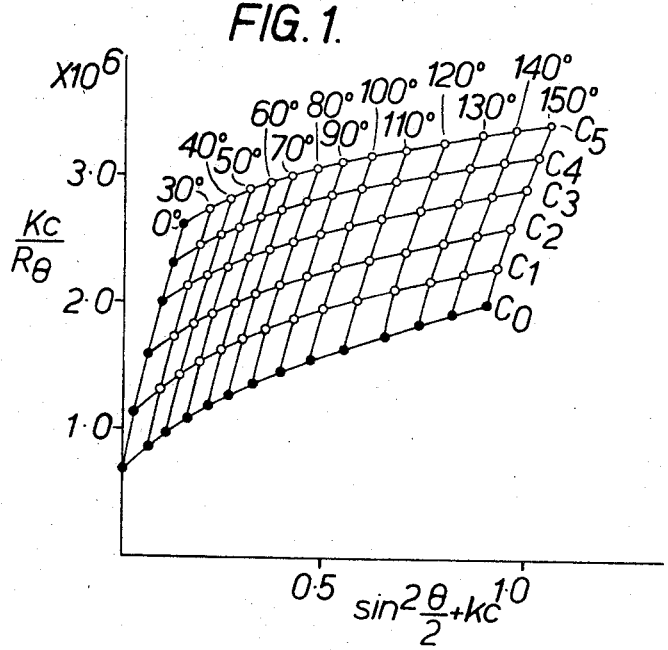
FIG. 1 is a Zimm plot shown for a better understanding of the principle of the invention.

For a better understanding of the invention, a brief comment on Zimm plots may be made with reference to FIG. 1, wherein there is shown a net of curves with small circles and dots on them. A Zimm plot is a graph contrived by B. H. Zimm (Journal of Chemical Physics, vol. 16, page 1099, 1948) which is convenient for analysis of the results of measurement of light scattering through a sample solution. When light is transmitted through a sample solution containing a high polymer, for example, the light is scattered by the molecules of the high polymer (and also by the solvent) in various directions. The intensity of the scattering light at an angle $\theta$ relative to the axis of the incident light (the optical axis 18 of the device) is given as $i_\theta$. The intensity of light transmitted through the sample at zero angle relative to the axis of the incident light is given as $i_0$, that is, the optical axis 18 in FIG. 2. The reduced intensity $R_\theta$ is given as:

$$\frac{i_\theta}{i_0} \cdot \frac{\sin \theta}{1+\cos^2 \theta}$$

If $\sin^2 \theta + kc$ is taken on the abscissa and $Kc/R_\theta$ is taken on the ordinate, a grid-like plot will be obtained, which can be extrapolated to zero concentration and to zero angle. The graph thus obtained is a Zimm plot. These family of curves may be drawn in the following manner: Using solutions of different concentrations of a high polymer to be analyzed, the intensity of scattered light $i_\theta$ at different angles of scattering $\theta$, for example, at every 10 degrees, and also the intensity of light at zero angle $i_0$ are measured. From the measurement data thus obtained the reduced intensity $R_\theta$ can be calculated. If $Kc/R_\theta$ is plotted as a function of $\sin^2 \theta 2+kc$, a grid-like plot as shown in FIG. 1 will be obtained, which can be easily extrapolated to zero concentration and to zero angle. The graph thus obtained is called a Zimm plot. Here and in the following description, K is a constant depending upon the kind of a polymer to be analyzed; c is the concentration of the solution; and k is an arbitrary constant chosen so that the plotted points are suitably spread out; and on the curves, the small circles are the plotted points, while the dots are the extrapolated values.

As previously mentioned, the calculations required for making a Zimm plot from the measurement data are complicated and time-consuming. This laborious work has been completely eliminated by the instrument of the invention, a preferred embodiment of which will now be described in detail.

Figure 2:
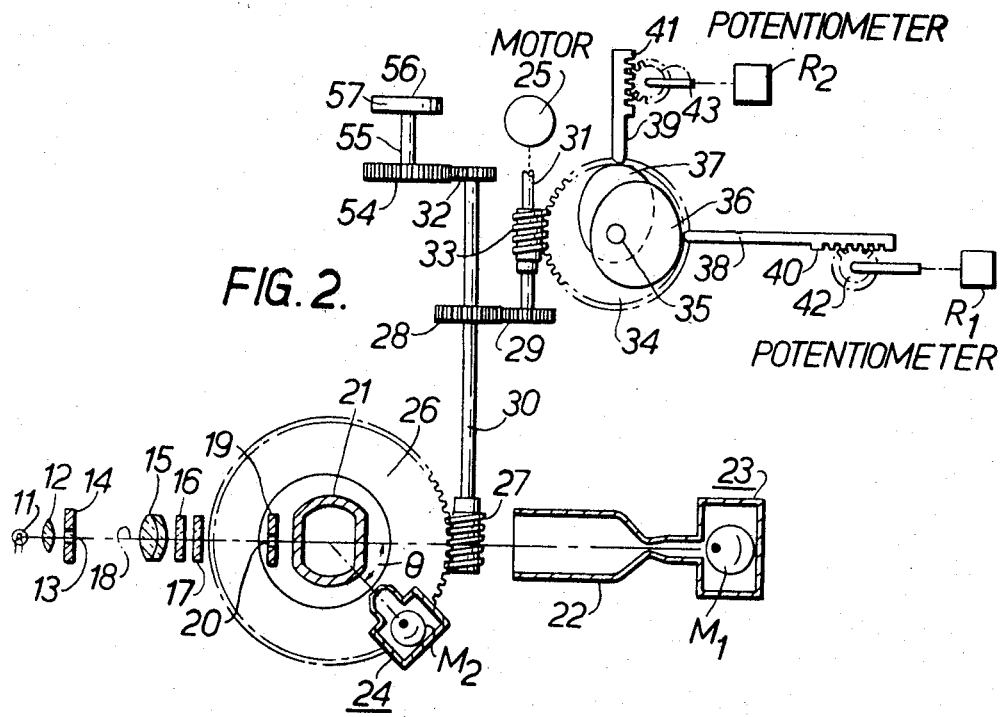
FIG. 2 is a schematic drawing of the optical and mechanical portions of the instrument of the invention.

FIG. 2 shows the optical system and the mechanical portion of the instrument of the invention. The optical system comprises a suitable light source 11 and a condensing lens 12 disposed in alignment therewith for converging the light from the source into a pinhole 13 formed in the plate 14. The light passing through the pinhole 13 is applied to a collimating lens 15 which is disposed in axial alignment with the previously mentioned optical elements and which renders the rays of light parallel. The parallel rays of light travel through a neutral filter 16 and a monochromatic filter 17. Along the optical axis 18 and rearwardly of the filter 17 there is disposed a plate 19 having a slit 20 of a desired area formed therein in alignment with the optical axis 18 so that the monochromatic light from the filter 17 is peripherally intercepted by the plate 19 and a desired central portion thereof passes through the slit 20 to arrive at a sample container 21 in which a high polymer solution to be analyzed is to be contained.

When the light enters the solution, part of it is scattered in varying quantities and different directions by the molecules of the high polymer in the solution, while the other part of the light passes straight through the sample so as to enter a light trap 22, where a large portion of the unscattered light is absorbed. At the end of the light trap is provided a light-sensitive device 23 having a phototube $M_1$ for receiving the remaining portion of the light and producing a voltage proportional to the quantity or intensity of light being received thereby. Another photosensitive device 24 having a phototube $M_2$ is provided for receiving the scattered light from the sample and converting it into a voltage proportional to its intensity. The use of the outputs of the two phototubes $M_1$ and $M_2$ will be described in detail hereinafter.

In order to measure the scattered light intensity at various angles $\theta$ relative to the optical axis, the photosensitive device 24 is so arranged as to be rotatable through a desired range of angle about the sample container 21. To this end, the device 24 is rigidly mounted on a rotary disk which is driven by a motor 25 through a suitable reduction gearing comprising a plurality of gears 26, 27, 28 and 29. For simplicity and clarity, the rotary disk is not shown in the drawing, but may be considered identical or incorporated with the gear 26. This gear 26 meshes with the worm 27 carried on a common shaft 30 with the gear 28, which in turn meshes with the gear 29 mounted on the output shaft 31 of the motor 25. The shaft 30 carries another gear 32 which is so adapted as to drive a marking device of the instrument of the invention as will be described later. The output shaft 31 of the motor is provided with a worm 33 meshing with a gear 34 carried on a shaft 35. Rigidly fixed to this shaft are a pair of cams 36 and 37 having followers 38 and 39, respectively. The followers are borne against the peripheries of their respective cams by suitable means such as a spring (not shown) and provided with racks 40 and 41 meshing with gears 42 and 43, respectively. These gears are mechanically connected to potentiometers $R_1$ and $R_2$ in FIGS. 3 and 4, respectively, so that rotation of the gears 42 and 43 results in variation in the resistance of the respective potentiometers to provide voltage control at predetermined points in the circuit consistuting the electrical portion of the instrument, as will be described in detail hereinafter.

It will be readily seen that rotation of the motor output shaft 31 causes the gear 26 and, consequently, the photosensitive device 24 to turn through an angle $\theta$ from the optical axis, on one hand, and the cams 36 and 37 to rotate on their common shaft 35 through the gears 33 and 34 on the other hand. When the cams are turned, their respective followers 38 and 39 slide on the cam surfaces so as to be moved in linear directions. This linear movement of the cam followers causes a corresponding rotation of the gears 42, 43 which results in a change in the outputs of the associated potentiometers $R_1$, $R_2$ as mentioned above. The two cams 36, 37 are of such contour in edge that when the photosensitive device 24 has turned through an angle $\theta$, the output voltages of the associated potentiometers $R_1$, $R_2$ will become proportional to $\sin \theta/(1+\cos^2 \theta)$ and $\sin^2 \theta/2$, respectively.

As previously mentioned, in accordance with the invention, the results of the measurement are automatically recorded as a number of curves drawn for $Kc/R_\theta$ as a function of $\sin^2 \theta/2 + kc$. To this end, an X–Y recorder schematically shown as 44 in FIG. 3 is provided having an actuator (not shown) which moves a pen along the X- and Y-axis of the graph paper in accordance with the X- and Y-axis control signals corresponding respectively to $\sin^2 \theta/2 + kc$ and $Kc/R_\theta$.

Figure 3:
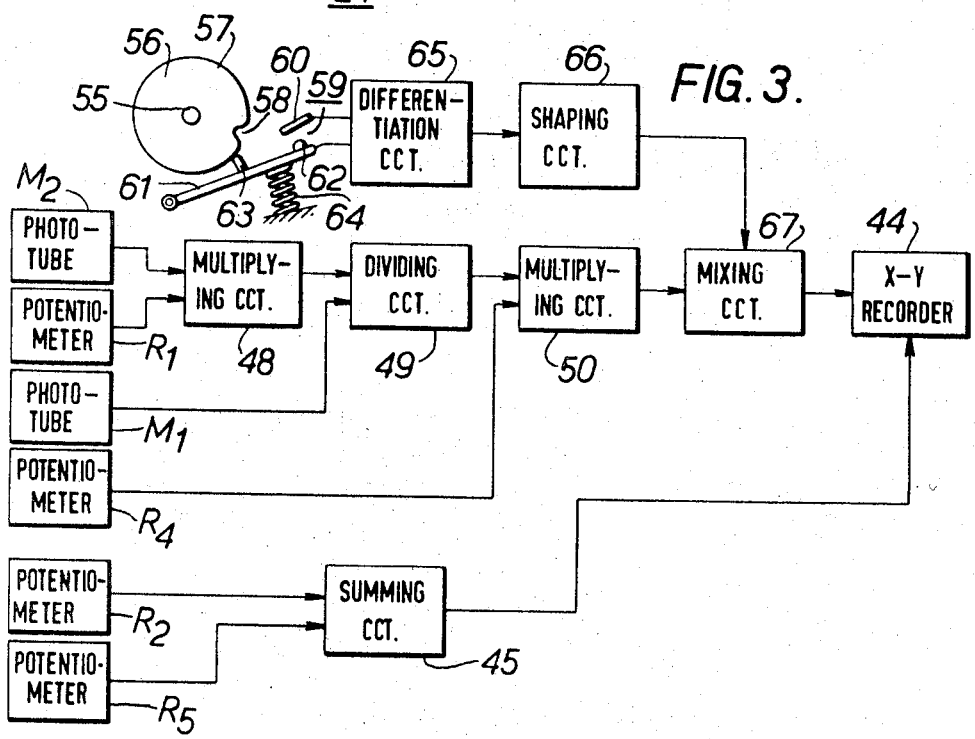
FIG. 3 is a block diagram of the electrical portion of the instrument of the invention.

A circuit arrangement for producing such control signals of the recorder pen is shown in block diagram in FIG. 3. The circuit may be divided into three portions, one of which shown at the lower side of the drawing is for producing X-axis control signals, while a second thereof just above is for producing Y-axis control signals and the third shown at the upper side is for producing marking signals to be superposed on the Y-axis control signal in such a manner and with such a result as will be described hereinafter.

The X-axis control signal producing circuit comprises the previously mentioned potentiometer $R_2$, another potentiometer $R_5$ and a circuit 45 for summing the outputs of the two potentiometers $R_2$ and $R_5$ so as to produce a signal proportional to the sum to be applied to the X-axis terminal of the recorder 44. The circuit arrangement is shown in more detail in FIG. 4b, wherein $E_1$ and $E_2$ are cells applying suitable voltages across the potentiometers $R_2$ and $R_5$, respectively. One end of the potentiometer $R_2$ is connected to the slider arm $S_5$ of the other potentiometer $R_5$. The slider $S_2$ of the potentiometer $R_2$ is mechanically connected to the gear 43 (see FIG. 2) on one hand and electrically connected through a line L to the X-axis input terminal (not shown) of the recorder on the other.

When the phototube $M_2$ is positioned at an angle $\theta$ relative to the optical axis, the slider $S_2$ of the potentiometer $R_2$ is moved in accordance with the angle $\theta$ by means of the cam-and-gear transmission as previously mentioned to produce a potential proportional to $\sin^2 \theta/2$. The other potentiometer $R_5$ is set manually such as by means of a knob 46 in accordance with the concentration of the solution to be analyzed so that a potential $kc$ is produced. The two potentials are summed up to provide on the line $L_1$ a potential proportional to the quantity of $\sin^2 \theta 2 + kc$, which is applied to the X-axis input terminal of the recorder to move the pen accordingly.

Figure 4A:
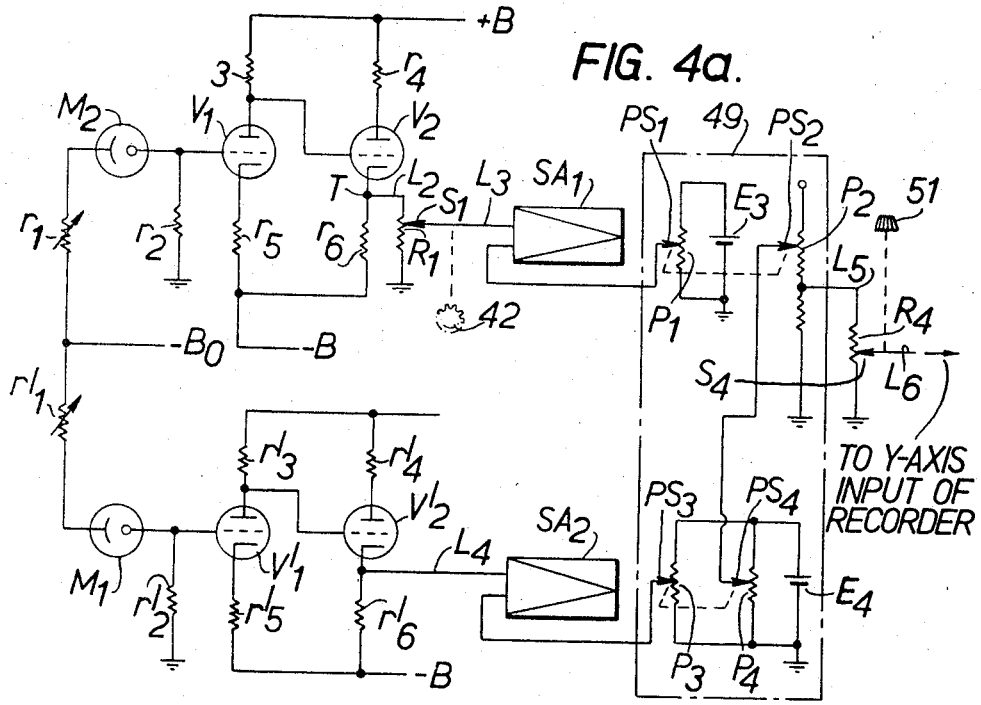
FIGS. 4a and 4b are wiring diagrams of the electrical portion of the instrument of the invention.
Figure 4B:
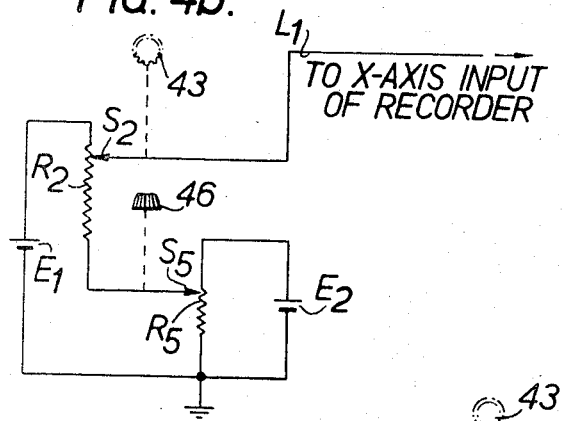
Figure 5A:
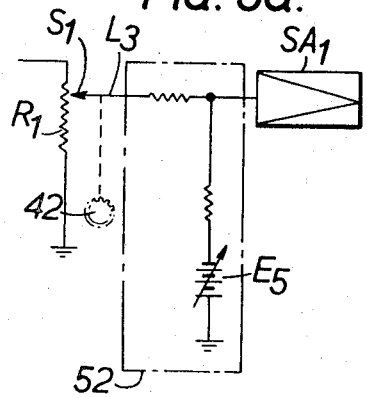
Figure 5B:
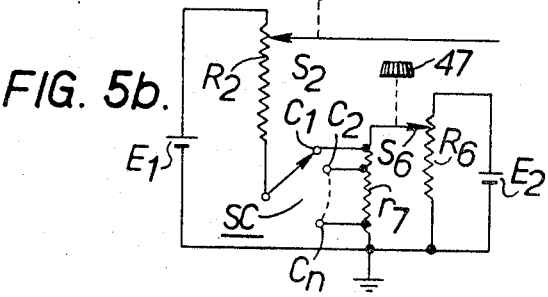
FIG. 5b is a modification of FIG. 4b.

A modification of FIG. 4b is shown in FIG. 5b, wherein the potentiometer of FIG. 4b is replaced by a selector switch SC having a movable contact and a plurality of fixed contacts $C_1, C_2 \ldots, C_n$ connected to different suitable points of a resistor $r_7$, respectively. One end of the resistor $r_7$ is connected to the slider arm $S_6$ of a potentiometer $R_6$ which is in turn connected across the cell $E_2$. The selector switch is adjusted in accordance with the concentration $c$ of a polymer solution to be analyzed, and the slider arm is adjusted by a knob 47 to choose a desired value of $k$. Thus, it will be seen that in this modification, the value of $k$ can be varied independently of the concentration $c$.

The signals which control the movement of the recorder pen along the Y-axis are produced as follows: Referring to the middle portion of the block diagram of FIG. 3, the phototube $M_2$, displaced the same angle $\theta$ from the optical axis as before, produces an output $k'i_\theta$ which is proportional to the intensity of light $i_\theta$ scattered from the sample under test and received by the phototube. A potential proportional to $\sin \theta/(1+\cos^2 \theta)$ is derived by means of the previously mentioned cam-controlled potentiometer $R_1$ in accordance with the angular displacement of the phototube $M_2$. The other phototube $M_1$ which is always fixed at zero angle position produces an output $k''i_0$ proportional to the light intensity $i_0$ being received by the phototube, and a potential proportional to $Kc$ is derived by means of a manually adjustable potentiometer $R_4$.

The potential proportional to $\sin \theta/(1+\cos^2 \theta)$ is multipled by the $k'i_\theta$ potential by means of a multiplying circuit 48 to produce a potential of $k'i_\theta \sin \theta/(1+\cos^2 \theta)$, by which the $k''i_0$ potential is divided by means of a dividing circuit 49 to provide at the output thereof a potential of $$\frac{k''i_0}{k'i_\theta \sin \theta/(1+\cos^2 \theta)}$$

This potential is then multiplied by the $Kc$ potential by means of a multiplying circuit 50, so that the resultant output of the circuit will become proportional to $Kc/R_\theta$ and be applied to the recorder as a Y-axis control signal.

A detailed wiring diagram of the above Y-axis control signal producing circuit is shown by way of example in FIG. 4a. Here, the phototubes $M_1$ and $M_2$, which constitute the sensor portions of the photosensitive devices 23 and 24, respectively, are shown having their cathodes connected to a common $-B_0$ source through variable resistors $r_1$ and $r'_1$, respectively. The function of these variable resistors will be described later. The anode of the tube $M_2$ is connected to the input of a two-stage amplifier comprising triodes $V_1$ and $V_2$. The anode of the tube $M_2$ is also grounded through a resistor $r_2$. Resistors $r_3$ and $r_4$ are inserted between a +B source and the anodes of the triodes $V_1$ and $V_2$, respectively, while resistors $r_5$ and $r_6$ are between a —B source and the cathodes of the triodes. The arrangement of such an amplifier is so conventional that there will be no need for any further description about it. To the cathode of the second amplifier tube $V_2$, such as at a point T, one end of the potentiometer $R_1$ is connected through a lead $L_2$. The other end of the potentiometer is grounded. The slider $S_1$ of the potentiometer $R_1$ is connected mechanically to the gear 42 of FIG. 2 as previously mentioned on one hand and electrically connected through a lead $L_3$ to the input of a servo-amplifier $SA_1$ on the other.

The anode of the other phototube $M_1$ is grounded through a resistor $r'_2$ and also connected to a two-stage amplifier similar to the previous one, wherein $V'_1$, $V'_2$, $r'_3$, $r'_4$, $r'_5$ and $r'_6$ correspond to, and are arranged in the same manner as, the elements $V_1$, $V_2$, $r_3$, $r_4$, $r_5$ and $r_6$, respectively. However, the output of this amplifier is directly connected to a servo-amplifier $SA_2$ through a lead $L_4$.

The output of the servo-amplifier $SA_1$ is connected to a slider $PS_1$ of a potentiometer $P_1$ across which a cell $E_3$ is connected. The slider $PS_1$ is mechanically ganged with the slider $PS_2$ of another potentiometer $P_2$ whose one end is connected through a lead $L_5$ to one end of the potentiometer $R_4$ previously stated. The slider $S_4$ of this potentiometer is connected mechanically to a manually adjustable knob 51 and at the same time electrically through a lead $L_6$ to the Y-axis input terminal of the recorder pen actuator.

Associated with the other servo-amplifier $SA_2$, there is provided a parallel combination of potentiometers $P_3$ and $P_4$ connected across a cell $E_4$. The sliders $PS_3$ and $PS_4$ of these potentiometers are mechanically ganged together and at the same time the former slider $PS_3$ is electrically connected to the output of the servo-amplifier $SA_2$ and the latter slider $PS_4$ to the slider $PS_2$ of the potentiometer $P_2$.

When the phototube $M_1$ which is fixed at zero angle position relative to the direction of the incident light receives straight light passing through the sample under analysis, the potential at the output increases in proportion to the intensity of light $i_0$ being received by the fixed phototube. After being amplified, the potential $k''i_0$ is applied through the servo-amplifier $SA_2$ to the slider $PS_3$ of the potentiometer $P_3$. On the other hand, the light scattered from the sample at an angle $\theta$ relative to the direction of the incident light is received by the rotatable phototube $M_2$ as it has just turned through the angle $\theta$, so that on the lead $L_2$ there appears an amplified potential $k'i_\theta$ proportional to the intensity of scattered light $i_\theta$ being sensed. This potential is multiplied by $\sin \theta/(1+\cos^2 \theta)$ by means of the potentiometer $R_1$ to produce on the lead $L_3$ a potential $k'i_\theta \sin \theta/(1+\cos^2 \theta)$, since the movement of the slider $S_1$ of the potentiometer $R_1$ is regulated by the cam-and-gear transmission mechanism in such a manner that the potential on the lead $L_3$ connected to the slider will become proportional to the quantity $\sin \theta/(1+\cos^2 \theta)$, as previously mentioned. The resultant potential $k'\theta \sin \theta/(1+\cos^2 \theta)$ and the $k''i_0$ potential from the other phototube $M_1$ are applied through the servo-amplifiers $SA_1$ and $SA_2$, respectively, to the sliders $PS_1$ and $PS_3$ of the potentiometers $P_1$ and $P_3$, respectively, so that the latter potential will be divided by the former by means of this dividing circuit 49. The resultant potential on the line $L_5$ now becomes $$\frac{k''i_0}{k'i_\theta \sin \theta/(1+\cos^2 \theta)}$$

which may be expressed as $1/R_\theta$. This $1/R_\theta$ potential will then be applied to the potentiometer $R_4$, whereby it is multiplied by $Kc$ to provide on the lead $L_6$ a potential proportional to $Kc/R_\theta$. This potential will finally be applied as a Y-axis control signal to recorder pen actuator.

As previously stated, the potentiometer $R_4$ is mechanically connected to the knob 51, by means of which it can be manually adjusted with respect to the constants K and $c$ in accordance with the kind or nature of a high polymer solution to be analyzed and the concentration of its solution.

It should be recognized that the multiplication by the two constants may be made at any point of the circuit, whether simultaneously or separately. In the latter case, the arrangement may be such that the constant K is varied by means of the variable resistors $r_1$ and/or $r'_1$ and the constant $c$ by means of the potentiometer $R_4$ or a selector switch in place of it. With this arrangement, when it is necessary to vary the constant K in accordance with the kind of a high polymer solution to be analyzed, this can be effected by varying the sensitivities of the phototubes $M_1$ and/or $M_2$ by means of the variable resistors $r_1$ and/or $r'_1$. In this connection, the multiplication by $\sin \theta(1+\cos^2 \theta)$ and the division of $k''i_0$ may also be made at any other point of the circuit.

In explanation, $i_\theta$ is the intensity of light scattered from the sample at an angle $\theta$ relative to the optical axis 18. More particularly, $i_\theta$ is a combination of the intensity of light scattered by the solute in the sample at an angle $\theta$ relative to the optical axis and the intensity of light scattered by the solvent only at the angle $\theta$, which latter intensity is $i_{\theta o}$. Usually, $i_{\theta o}$ may be negligible, so that $i_\theta$ may be considered as caused by the solute (high polymer) in the sample. However, if the component $i_{\theta o}$ contained in the value $i_\theta$ is not negligible, errors resulting therefrom must be corrected or compensated for. To this end, a circuit for subtracting $k''_{oo} \sin \theta/(1+\cos^2 \theta)$ from $k'i_\theta \sin \theta/(1+\cos^2 \theta)$ may be added to the circuit of FIG. 4a between the slider $S_1$ of the potentiometer $R_1$ and the servo-amplifier $SA_1$, supposing that $k'i_{\theta o} \sin \theta/(1+\cos^2 \theta)$ is constant for all $\theta$ values. FIG. 5a shows by way of example such an arrangement, wherein the compensating circuit 52 comprises a variable voltage source $E_5$ connected between the lead $L_3$ and ground so that a potential proportional to $(i_\theta - i_{\theta o}) \sin \theta/(1+\cos^2 \theta)$ will be applied to the servo-amplifier $SA_1$. Thus, $R_\theta$ can be compensated for errors resulting from $i_{\theta o}$.

Figure 6:
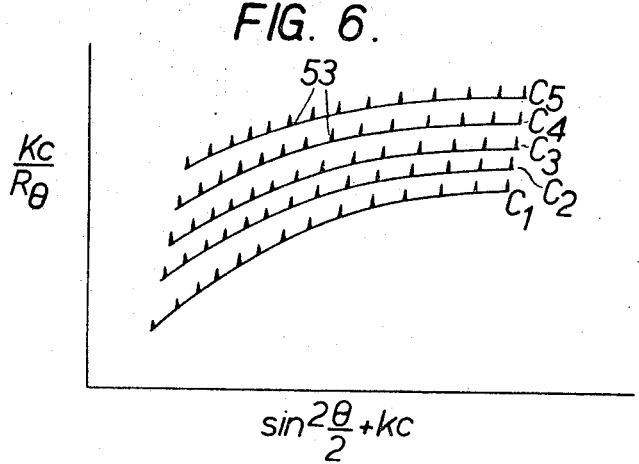
FIG. 6 is an example of Zimm plots which can be produced by the instrument of the invention.

It is desirable to have plotted curves marked at every certain angle the photoelectric device 24 or phototube $M_2$ has turned through. To effect it, at every desired angle of rotation of the device 24, a signal may be applied to the Y-axis control signal of the recorder pen actuator so as to put a mark such as pips 53 shown in FIG. 6 on the curve the pen is tracing. An example of such a marker will be described with reference to FIGS. 2 and 3. In FIG. 2, a gear 54 is shown carried fixedly on a shaft 55 and meshing with the gear 32 driven by the motor 25. This shaft also carries fixed thereto a rotary cam 56 provided at a point on its circumferential edge 57 with a notch 58. Adjacent to the cam 56, there is disposed a switch 59 comprising a fixed contact 60 and a pivoted arm 61 provided with a movable contact 62 and a cam follower 63. The arm 61 is so urged by any suitable means such as a spring 64 that as the cam 56 rotates, the follower 63 slides on the cam surface 57 until it snaps into the notch 58. This closes the switch 59 to complete a circuit comprising a differentiation circuit 65, a shaping circuit 66 and a mixing circuit 67, where the signal produced by the closure of the switch is superposed on the Y-axis control signal so as to move the recorder pen to produce a pip along the Y-axis on the curve. It will be easily understood that every one revolution of the cam 56 puts a mark in the form of pip on the curve, and that if the arrangement is such that the rotation of the photosensitive device 24 through every certain angle, say 5 degrees, results in one complete revolution of the cam 56, the curves are regularly marked at that angle, as shown in FIG. 6.

It will thus be seen that the objects of the invention are efficiently attained by the specific embodiments thereof as described above in detail. It should be recognized, however, that the embodiments are merely illustrative and that various modifications may be made without departing from the spirit and scope of the invention as defined in the appended claims. For example, in order to measure the intensity of light $i_0$ at zero angle, a translucent mirror may be placed in the optical axis before the light from the source enters the sample so that part of the light reflected by the mirror will be sensed by a photosensitive device provided at a suitable fixed position. In the illustrated embodiment, the electrical signal is used to move the recorder pen. So far as the X-axis movement of the pen is concerned, the same result may be obtained purely mechanically by so arranging that the angular displacement of the rotatable photosensitive device $M_2$ results in the linear X-axis movement of the recorder pen proportional to $\sin^2 \theta/2$, with its starting point being displaced an amount corresponding to $kc$. Again in the illustrated embodiment, the marking signals are superposed on the Y-axis control signals of the recorder pen, so that the marks are in the form of regularly separated pips on the curves being traced out by the pen. Such marks may be put on any other suitable place, say below the X-axis line, of the graph paper by providing a separate pen to which the marking signals may separately be applied.

What I claim is:

1. A light scattering photometer comprising: a source of light; light transmittable means for containing a sample to be analyzed; means for directing the light from the source to the sample, at least a portion of the light being caused to pass therethrough; first photoelectric means disposed rotatably about the sample for receiving light scattered from the sample at different angles relative to the direction of the incident light to produce an output proportional to the scattered light intensity; second photoelectric means so fixedly disposed as to receive light transmitted through said sample at zero angle relative to the direction of the incident light to produce an output proportional to the light intensity at zero angle; driving means for rotating said first-named photoelectric means; an X–Y recorder; first converting means operatively connected to said driving means for converting the rotation of the first-named photoelectric means into a relative movement of the recorder pen along the X-axis proportional to $\sin^2 \theta/2+kc$ wherein $\theta$ is the angle of rotation of the photoelectric means relative to the direction of the incident light, $k$ is a preselected constant and $c$ depends on the concentration of the sample solution; and second converting means operatively connected to said driving means for converting the rotation of said first-named photoelectric means and the outputs of said first and second photoelectric means into a relative movement of the recorder pen along the Y-axis proportional to $Kc/R_\theta$ wherein K is a preselected constant and $R_\theta$ is the reduced intensity and defined by:

$$\frac{i_\theta}{i_o} \cdot \frac{\sin \theta}{1+\cos^2 \theta}$$

wherein $i_\theta$ is defined as the intensity of the scattered light at an angle $\theta$ relative to the axis of the light incident on said sample, and $i_o$ is defined as the intensity of light transmitted through said sample at a zero angle relative to the axis of the incident light.

2. A light scattering photometer of claim 1, wherein said first converting means includes means for preselecting the value of the $k$.

3. A light scattering photometer of claim 1, wherein said second converting means includes means for preselecting the value of the K.

4. A light scattering photometer of claim 1, further including means for applying market signals to the Y-axis control signal at every predetermined angle of rotation of the first-named photoelectric means, whereby as a curve is traced by the recorder, it is marked at intervals along the X-axis.

5. A light scattering photometer of claim 1, wherein said sample includes a solute and a solvent, and further including means for compensating for errors resulting from the scattering intensity of the solvent of the sample.

6. A light scattering photometer comprising: a source of light; light transmittable means for containing a sample to be analyzed; optical means for directing the light from the source to the sample for at least a portion of the light to pass therethrough; first photoelectric means disposed rotatably about the sample for receiving light scattered from the sample at different angles from the optical axis to produce an output proportional to the scattered light intensity; second photoelectric means so fixedly disposed as to receive light transmitted through said sample at zero angle from the optical axis to produce an output proportional to the light intensity at zero angle; driving means for rotating said first-named photoelectric means; an X–Y recorder; first cam means operatively connected to said driving means to be rotated thereby; first electrical circuit means associated with said first cam means to produce a potential to be applied as an X-axis control signal to the recorder to effect a corresponding movement of the recorder pen, said potential being proportional to $\sin^2 \theta/2+kc$ wherein $\theta$ is the angle of rotation of said first-named photoelectric means from the optical axis, $k$ is a preselected constant and $c$ depends on the concentration of the sample solution; second cam means operatively connected to said driving means to be rotated thereby; second electrical circuit means including said first and second photoelectric means and associated with said second cam means to produce a potential to be applied as a Y-axis control signal to the recorder to effect a corresponding movement of the recorder pen, said last-named potential being proportional to $Kc/R_\theta$ wherein K is a preselected constant and $R_\theta$ is the reduced intensity and defined by:

$$\frac{i_\theta}{i_o} \cdot \frac{\sin \theta}{1+\cos^2 \theta}$$

wherein $i_\theta$ is defined as the intensity of the scattered ligh at an angle $\theta$ relative to the axis of the light incident on said sample, and $i_0$ is defined as the intensity of light transmitted through said sample at a zero angle relative to the axis of the incident light.

7. A light scattering photometer of claim 6, wherein said first electrical circuit means includes means for preselecting the value of the $k$.

8. A light scattering photometer of claim 6, wherein said second electrical circuit means includes means for preselecting the value of the K.

9. A light scattering photometer of claim 6, further including a third cam means operatively connected to said driving means to be rotated thereby and electrical circuit means actuated by said third cam means at predetermined intervals to produce a signal to be applied to said Y-axis control signal so as to produce pips on the curves traced by the recorder at corresponding intervals along the X-axis.

10. A light scattering photometer of claim 6, wherein said sample includes a solute and a solvent, and further including electrical circuit means connected to said Y-axis control signal producing circuit means for compensating $R_\theta$ for errors resulting from the scattering intensity of the solvent $i_{\theta o}$ which represents the intensity of light scattered only by the solvent at the angle $\theta$.

11. A light scattering photometer comprising: a source of light; light transmittable means for containing a sample to be analyzed; optical means for directing the light from the source to the sample for at least a portion of the light to pass therethrough; a first photoelectric means disposed rotatably about the sample for receiving light scattered from the sample at different angles from the optical axis to produce an output proportional to the scattered light intensity $i_\theta$; a second photoelectric means so fixedly disposed as to receive light transmitted through said sample at zero angle from the optical axis to produce an output potential proportional to the light intensity $i_0$ transmitted at zero angle; driving means for rotating said firsthand photoelectric means; and X–Y recorder; first cam means having a cam operatively connected to said driving means to be rotated thereby; first electrical circuit means including a first potentiometer having its slider connected to said first cam to be moved thereby so as to produce a potential proportional to $\sin^2 \theta/2$ wherein $\theta$ is the angle of rotation of said rotatable photoelectric means, said first electrical circuit means also including second electrical circuit means for providing a potential proportional to $kc$ wherein $k$ is a preselected constant and $c$ depends on the concentration of the sample solution to be analyzed, said first potentiometer and second electrical circuit means being so connected as to constitute a summing circuit by means of which said potentials proportional to $\sin^2 \theta/2$ and $kc$ respectively are summed to produce a potential proportional to $\sin^2 \theta/2 + kc$, which is applied as an X-axis control signal to the recorder; a second cam means having a cam operatively connected to said driving means to be rotated thereby; third electrical circuit means including said first and second photoelectric means, a second potentiometer having its slider connected to said second cam means to be rotated thereby so as to produce a potential proportional to $\sin \theta/(1+\cos^2 \theta)$, said first rotatable photoelectric means and said second potentiometer being so connected as to constitute a multiplying circuit by means of which said output proportional to $i_\theta$ is multiplied by the potential proportional to $\sin \theta/1+\cos^2 \theta)$ to produce a potential proportional to $i_\theta \sin \theta/(1+\cos^2 \theta)$, a dividing circuit by means of which said output potential proportional to $i_0$ is divided by the potential proportional to $i_\theta \sin \theta/(1+^2\theta)$ to produce a potential $1/R_\theta$ equal to $$\frac{i_o}{i_\theta \sin \theta/(1+\cos^2 \theta)}$$

and fourth electrical circuit means for producing a potential proportional to $Kc$ wherein $K$ is a preselected constant and $c$ depends on the concentration of a sample solution to be analyzed, said dividing circuit and fourth electrical circuit means being so connected as to constitute a multiplying circuit by means of which the output potential of the dividing circuit is multiplied by the $Kc$ potential to produce a potential equal to $Kc/R_\theta$, which is applied as a Y-axis control signal to the recorder.

12. A light scattering photometer of claim 11, wherein said second electrical circuit means for producing the $kc$ potential is a potentiometer.

13. A light scattering photometer of claim 11, wherein said second electrical circuit means for producing the $kc$ potential comprises two separate variable resistor elements connected to each other, whereby the values $k$ and $c$ are individually preselected upon adjusting said resistor elements.

14. A light scattering photometer of claim 11, wherein said fourth electrical circuit means for producing the $Kc$ potential comprises means for varying the sensitivity of at least one of said photoelectric means, and whereby the value of K is preselected and a potentiometer connected to the output of said dividing circuit for individually preselecting the value of $c$.

15. A light scattering photometer of claim 11, further including marking means comprising a cam so arranged as to be rotated by said driving means, and a differentiation circuit actuated by said cam at predetermined intervals to produce a trigger signal to be superposed on said Y-axis control signal to produce pips on the curve being traced by the recorder at corresponding intervals along the X-axis.

16. A light scattering photometer of claim 11, wherein said sample includes a solute and a solvent, and wherein said Y-axis control signal producing circuit means further includes a subtraction circuit for producing a potential proportional to $(i_\theta - i_{\theta o}) \sin \theta/(1+\cos^2 \theta)$ wherein $i_{\theta o}$ is the intensity of the light scattered only by the solvent of the sample at the angle $\theta$.

17. A light scattering photometer of claim 16, wherein said subtraction circuit comprises a variable voltage source interposed between the first multiplying circuit and the dividing circuit.

References Cited

UNITED STATES PATENTS

| | | | |
|---|---|---|---|
| 2,873,644 | 2/1959 | Kremen et al. | 88—14 |
| 3,031,917 | 5/1962 | Pelavin. | |
| 3,236,148 | 2/1966 | Pelavin. | |

FOREIGN PATENTS

| | | |
|---|---|---|
| 668,433 | 3/1952 | Great Britain. |

JEWELL H. PEDERSEN, *Primary Examiner.*

W. A. SKLAR, *Assistant Examiner.*

U.S. Cl. X.R.

250—218; 346—33; 356—182